Sept. 5, 1967  R. CUTLER ET AL  3,339,580
FLOW REGULATOR
Filed March 22, 1965
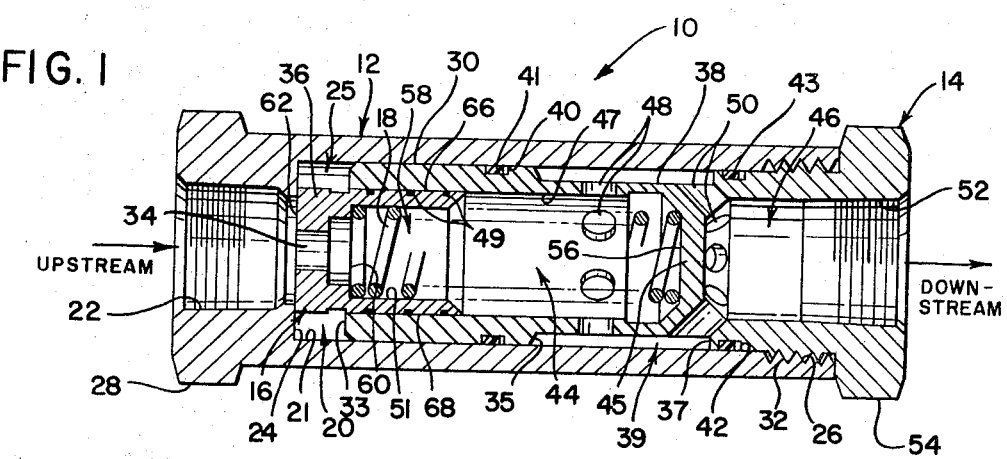
FIG. 1
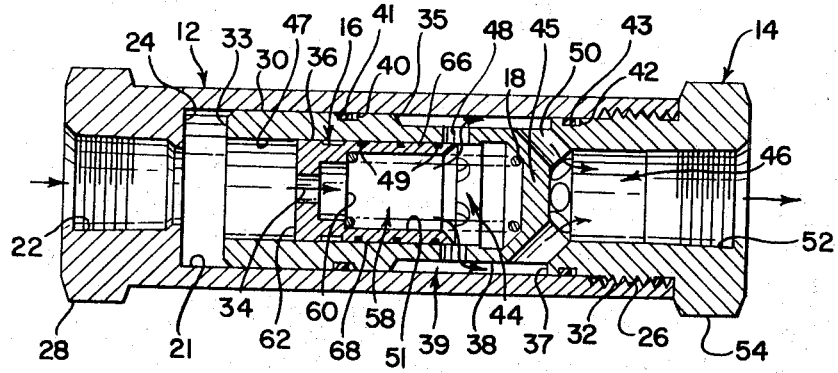
FIG. 2
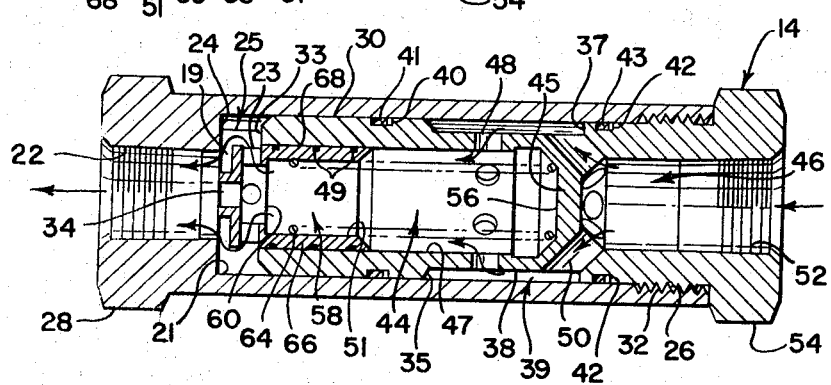
FIG. 3
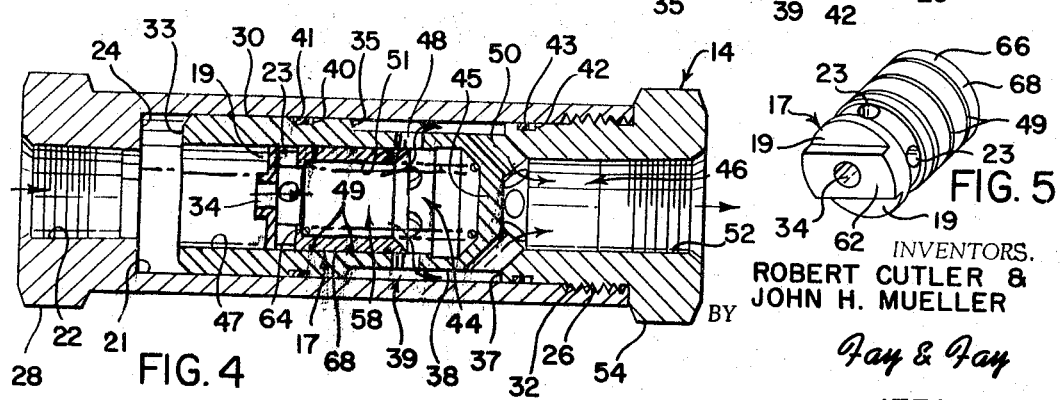
FIG. 4
FIG. 5
INVENTORS.
ROBERT CUTLER &
JOHN H. MUELLER
BY *Fay & Fay*
ATTORNEYS

FLOW REGULATOR

Robert Cutler, Parma, and John H. Mueller, Olmsted Township, Ohio, assignors to Republic Manufacturing Company, Cleveland, Ohio, a corporation of Ohio
Filed Mar. 22, 1965, Ser. No. 441,585
2 Claims. (Cl. 137—504)

This invention relates to valves in general and more specifically to flow control valves, frequently referred to as flow regulators.

Basically, the flow regulator has a restriction which limits the rate of flow of a fluid. Flow regulators are of two types: fixed flow and variable flow. Some flow regulators are also pressure compensated which means that rate of flow through the regulator remains constant regardless of pressure fluctuations upstream or downstream of the regulator.

In some applications, a fluid power system may be designed so that in certain portions of the circuit the fluid flow be regulated and allowed to flow only in one direction. For these applications, simple flow regulators that allow and control flow of fluid in only one direction are adequate.

However, in other applications, portions of a fluid power circuit may require that fluid flow in both directions, regulated one way, free-flowing the reverse way. For instance, this may be required in a machine such as a planer where a hydraulic cylinder advances a cutting tool at controlled speed in the cutting direction and retracts it rapidly to start a new cutting stroke.

Flow regulators that incorporate both controlled and free return flow, also known as free reverse flow, are desirable because they are economical, greatly simplify hydraulic circuitry and facilitate installation and maintenance.

Flow regulators of this type present serious and troublesome problems, the major drawback being that entirely different valves and component parts are utilized in the manufacture of each of these two types of flow regulators. This method of designing and manufacturing flow regulators is inefficient, uneconomical and wasteful.

With the foregoing problems in mind, it is an object of this invention to provide a flow regulator that can control rate of flow in one direction, as well as be modified to provide free, unrestricted flow in the opposite direction.

It is a further object of this invention to provide a flow regulator that can be converted from one type to the other by substituting only one member within the flow regulator assembly.

These and other objects of this invention will become apparent from the following description of the preferred embodiment of the invention and the study of the accompanying drawings.

In the drawings,

FIG. 1 is a longitudinal, cross sectional view through a flow regulator for controlling and allowing flow in one direction only at rest.

FIG. 2 is a longitudinal, cross sectional view of the regulator in FIG. 1 showing the piston in a position where it is regulating fluid flow.

FIG. 3 is a longitudinal, cross sectional view through a flow regulator for controlling flow in one direction and allowing free reverse flow in the reverse direction.

FIG. 4 is a longitudinal, cross sectional view of the regulator in FIG. 3 showing the valve piston in a position where it is regulating flow in the controlled direction.

FIG. 5 is an isometric view of a piston design suitable for use in a regulator as illustrated in FIGS. 3 and 4.

Referring more particularly to the drawings, the flow regulator embodying the invention is referred to in its entirety by the reference numeral 10, FIG. 1.

The flow regulator 10 comprises a valve housing 12, a body member 14, a piston 16, and a spring 18.

The valve housing 12 has a stepped, longitudinal passageway 20 therethrough, said passageway having at one end connecting means 22 suitable for connecting said housing to an appropriate fluid line. Connecting means 22 terminates at radial face 24 which merges with bore 21 of passageway 20. The opposite end of passageway 20, terminates in connecting means 26. Tool pads 28 provide means for gripping the main housing 12.

Body 14 is received slidably in bore 21 of valve housing 12. Connecting means 32 in body 14 cooperate with connecting means 26 in housing 12 holding said housing and body securely together. The length of body 14 is controlled so that when housing 12 and body 14 are in full engagement, they create an end chamber 25.

Body 14 is partially hollow having a longitudinaly, upstream chamber 44 separated from a longitudinal downstream chamber 46 by an intermediate, transverse wall 45.

Outer surface 30 of body 14 is interrupted by a recessed portion 38, intermediate radial, annular faces 35 and 37. When the valve housing and body are assembled, recess 38 in body 14 and bore 21 in housing 12 form an annular passage 39. Annular passage 39 connects upstream chamber 44 and downstream chamber 46 through radial, flow controlling ports 48 and non-flow controlling ports 50 respectively. Seal 41 in groove 40 in outer surface 30 is intermediate radial face 35 and end face 33 of body 14. Seal 43 in groove 42 in outer face 30 is intermediate radial face 37 and connecting means 32 in body 14. Downstream chamber 46 terminates at its downstream end in connecting means 52 suitable for connecting to an appropriate fluid line. Tool pads 54 provide means for gripping body 14.

Upstream chamber 44 has a bore 47 adapted to receive slidably the hollow piston 16 having a stepped longitudinal passageway 58 therethrough terminating in an orifice 34 in a head portion 36. The piston is biased away from intermediate wall 45 by spring 18, one end of said spring pressing against face 56 of wall 45. The opposite end of the spring bears against radial annular face 60 of the piston passageway 58, urging terminal face 62 of the piston against the radial face 24 in the passageway 20 of housing 12. When pressurized fluid enters end chamber 25, it pressurizes evenly the piston 16 helping center piston 16 in bore 47 of upstream chamber 44. The portion between bore 51 of piston passageway 58 and outer surface 68 of piston 16 forms the skirt portion 66 of the piston. Circumferential grooves 49 in the piston skirt 66 tend to equalize fluid pressure around the piston.

The flow regulator in FIG. 1 is designed to control the rate of fluid flow in one direction (toward the right). It allows restricted flow in the reverse direction and is shown in a non-regulating position. The same regulator is shown in FIG. 2 with skirt portion 66 partly blocking flow control ports 48.

FIG. 3 illustrates a flow regulator which performs two functions: it allows controlled flow in one direction (toward the right) and free, reverse flow in the opposite direction. The uniqueness of the design of this flow regulator is that piston 17 is in actuality the same as piston 16 but slightly modified. Piston 17 is made from piston 16 to which have been added radial apertures 23 and end undercut positions 19. The length of spring 64 is such that when piston 17 moves to regulate flow of fluid (toward the right in FIG. 3), the piston travels a considerable distance freely and against no resistance to permit radial apertures 23 to move past radial face 33 of the valve body and be completely blocked by bore 47 of the upstream chamber 44. Radial annular face 60 of the passageway 58 in the piston then contacts and begins to compress spring 64. All fluid must now flow through orifice 34 and the regulator is now in position to regulate fluid flow. The spring 64 is designed to enable piston 17 to travel the necessary, free distance rapidly to permit the piston to reach its flow regulating position almost instantaneously.

FIG. 4 illustrates the regulator in FIG. 3 with the skirt portion 66 of piston 17 partly blocking radial, flow-controlling ports 48, thus regulating fluid flow.

When fluid flows in the opposite, or free reverse, direction (toward the left in FIG. 3), fluid passes through chamber 46, ports 50, annular passage 39, and ports 48 into chamber 44 and moves piston 17 toward the left, urging terminal face 62 of the piston 17 against radial face 24 of the valve housing. Fluid flows through piston passageway 58, then radial apertures 23 into end chamber 25. From chamber 25 fluid passes through end undercut portion 19 into the passage of connecting means 22.

This invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed:

1. A free reverse flow regulator comprising in combination a main valve housing having a longitudinal passageway therethrough,
   said passageway being adapted to receive a mating body member having a longitudinal passageway therethrough,
   said passageway in said body being interrupted by a transverse wall member separating the passageway in said body member into an upstream chamber and a downstream chamber,
   said chambers being interconnected by radial apertures and an annular passage formed between the passageway in the main valve housing and the periphery of the mating body member,
   the upstream chamber in said body member having innerfitted therein a hollow reversible piston,
   said piston being biased away from said transverse wall member in the body by means of a spring,
   the passageway in said main valve housing having an enlarged bore near said upstream end, said bore being larger than said piston diameter and said upstream chamber,
   said housing having a restricted passageway smaller than said bore and said piston diameter,
   said piston having end undercut portions in said upstream end communicating with said enlarged bore,
   said piston further having radial apertures downstream from said end undercut portions,
   whereby under conditions of free reverse flow said piston provides fluid connections from said radial apertures into said enlarged bore and through said end undercut portions,
   whereby under the conditions of controlled flow said piston travels into said upstream chamber blocking said radial apertures in said piston head preventing fluid from flowing through said radial apertures.

2. The free reverse flow regulator of claim 1, in which the relationship of the valve housing and its restriction therein together with the body member and the upstream chamber therein in which the piston moves from one end to the other is such that the total length of the cavity formed between said piston and said upstream chamber is longer than the extended free state of the biasing spring,
   whereby the piston under conditions of controlled fluid flow moves closing the radial apertures before contacting said spring,
   whereby conditions are changed from free reverse flow to controlled flow almost instantaneously.

References Cited

UNITED STATES PATENTS

| | | | |
|---|---|---|---|
| 2,198,487 | 4/1940 | Sisk | 137—504 |
| 3,015,341 | 1/1962 | Hedland et al. | 137—504 |
| 3,120,243 | 2/1964 | Allen et al. | 137—504 |
| 3,155,111 | 11/1964 | Presnell | 137—504 |
| 3,170,481 | 2/1965 | Presnell | 137—504 |

M. CARY NELSON, *Primary Examiner.*

R. J. MILLER, *Assistant Examiner.*